Aug. 24, 1965    H. F. WUENSCHER    3,202,381
RECOVERABLE ROCKET VEHICLE

Filed Nov. 8, 1961    6 Sheets-Sheet 1

INVENTOR.
HANS F. WUENSCHER
BY
ATTORNEYS

Aug. 24, 1965  H. F. WUENSCHER  3,202,381
RECOVERABLE ROCKET VEHICLE
Filed Nov. 8, 1961  6 Sheets—Sheet 3
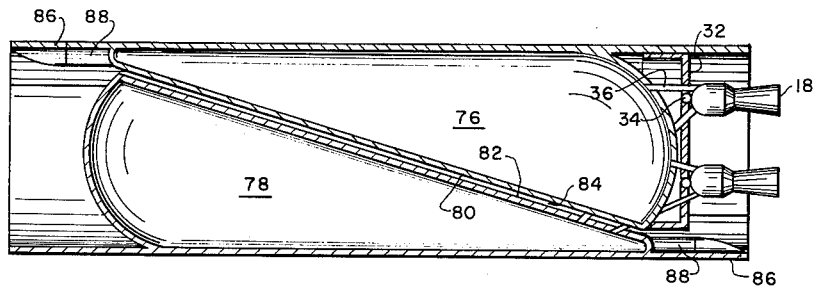
FIG. 8
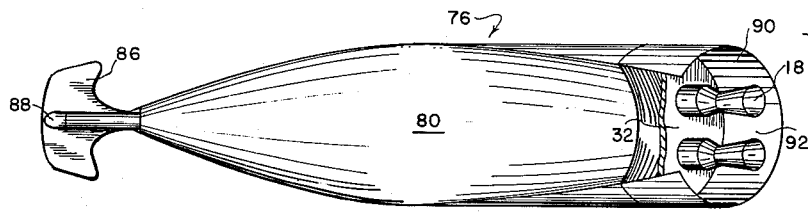
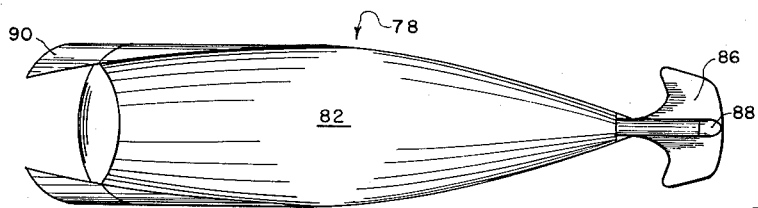
FIG. 9
*INVENTOR.*
HANS F. WUENSCHER
BY
*ATTORNEYS*

Aug. 24, 1965　　H. F. WUENSCHER　　3,202,381
RECOVERABLE ROCKET VEHICLE
Filed Nov. 8, 1961　　6 Sheets-Sheet 4
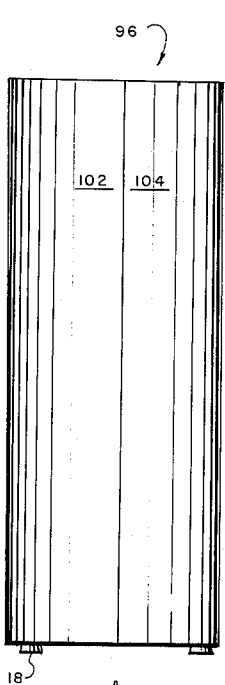
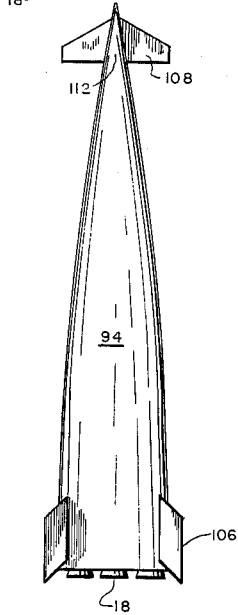
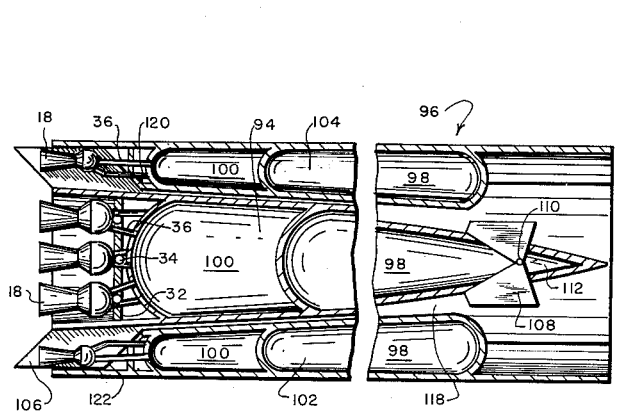
FIG. 10
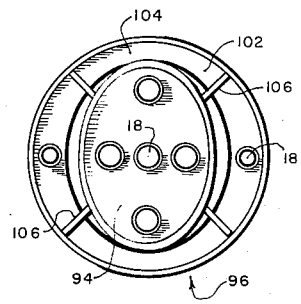
FIG. 13
FIG. 11
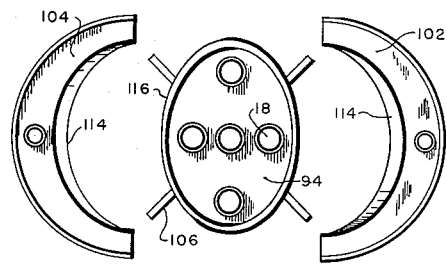
FIG. 12
INVENTOR.
HANS F. WUENSCHER
BY
ATTORNEYS

*INVENTOR.*
HANS F. WUENSCHER

BY

*ATTORNEYS*

INVENTOR.
HANS F. WUENSCHER
BY

ATTORNEYS

United States Patent Office 3,202,381
Patented Aug. 24, 1965

3,202,381
RECOVERABLE ROCKET VEHICLE
Hans F. Wuenscher, Huntsville, Ala., assignor to the United States of America as represented by the Administrator of the National Aeronautics and Space Administration
Filed Nov. 8, 1961, Ser. No. 151,114
7 Claims. (Cl. 244—1)
(Granted under Title 35, U.S. Code (1952), sec. 266)

The invention described herein may be manufactured and used by or for the Government of the United States of America for governmental purposes without the payment of any royalties thereon or therefor.

This invention relates generally to space vehicles wherein components may be recovered following use.

More particularly, it is applicable to multi-stage liquid or solid propellant type rocket vehicles wherein recovery of the stages and/or payload following burnout and separation is desirable.

In general, prior multi-stage vehicles of the type to which this invention appertains were not subject to recovery once they were airborne. In view of the cost, both from a material standpoint and from the standpoint of the loss of the vehicle to further applications and/or investigation, non-recovery is most wasteful economically and scientifically. Thus it becomes imperative that a system of economical recovery be devised before such vehicles will have the utmost utility in other than purely military or scientific applications.

It has previously been proposed that some components could be recovered by the employment of parachutes or helicopter type blades once the device is within the earth's atmosphere. Such methods are of course, at best, highly unreliable with respect to landing at predetermined places and, in addition, require added paraphernalia, additional weight and space in the vehicle itself, and create dangerous stresses in the vehicle on deployment of such devices. A further failing inherent in such a system is the impossibility of accurate control of such devices and the elaborate preparation which has to be made by support facilities for tracking and pick-up, as well as limited landing mediums such as water with its deleterious effect on material and operation.

The conventional tank or compartment arrangement within a cylindrical stage vehicle is in tandem. That is, the stage is subdivided into several propellant and/or equipment compartments by transversely dividing walls, domes, or bulkheads. In the case of diverse liquid propellants, the transfer of propellant from a forward compartment aftward to the engines creates a requirement for long, structurally stable suction lines which present weight penalties and create technical problems and difficulties with respect to flexible joints, insulation, higher flow resistance and consequent greater operating pressures, cleanliness, corrosion, vibration, etc.

It is a general object of this invention to provide for the recovery of rocket vehicle components.

It is another object of this invention to provide for the recovery of exhausted rocket components without basic increase in weight, space or apparatus.

It is a more specific object of the present invention to form individual stages of such a vehicle so that each stage comprises several separable, aerodynamically self-sufficient components.

It is a further specific object of the invention to provide a multi-stage rocket vehicle wherein each stage comprises separable recoverable components while maintaining the basic cylindrical shape which has been found to be most efficient with respect to load capacity, rigidity and stage coupling and separation.

It is an ancillary object of the invention to provide a liquid propellant tank arrangement wherein a minimum length of ducting from the propellant tank to the engine is required.

A further, more specific object is the provision of lift producing surfaces on each separable tank structure or section operative on separation of the tanks so that each tank forms a self-contained, airworthy or flyable, recoverable vehicle.

According to the present invention, the foregoing and other objects are attained by forming each individual stage of the rocket vehicle of a plurality of interfitting sections, each section of which is capable, in itself, of guided return to a given, predetermined station. The sections when mated maintain a cylindrical configuration, yet are, per se, aerodynamically stable in flight, that is, capable of being sustained by the atmosphere, or airworthy. The proposed tank or compartment arrangement is achieved by longitudinally divided interfitting walls or bulkheads. Generally, each of the compartments so formed extends in close proximity to the engines, permitting short, substantially equal length transfer lines. In general these compartments are shaped to fulfill two requirements: First, to form a self-sufficient airworthy re-entry or recovery aircraft; second, to fit in a cylindrical or substantially cylindrical shape to form the complete stage. This configuration achieves the best strength to weight ratio while permitting the transfer lines to be of minimal length.

Referring now to the drawings, wherein like reference characters designate like or corresponding parts throughout the several views, there is shown in:

FIGURE 1 a conventional, multi-stage rocket vehicle for orientation;

FIGURE 8 is a side sectional view of an alternate embodiment of the invention;

FIGURE 9 is a perspective view of the embodiment of FIGURE 8 with the sections separated;

FIGURE 10 is a longitudinal cross-sectional view of a modification of the device of the invention wherein a plurality of stages are telescoped;

FIGURE 11 is a rear view of the vehicle shown in FIGURE 10;

FIGURE 12 is a rear view, corresponding to FIGURE 11, of the device of FIGURE 10 separated into its major components;

FIGURE 13 shows the stages of FIGURE 10 following first stage separation;

Figure 1:
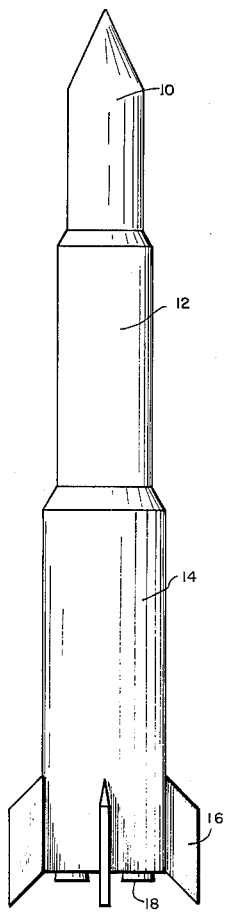
Figure 2:
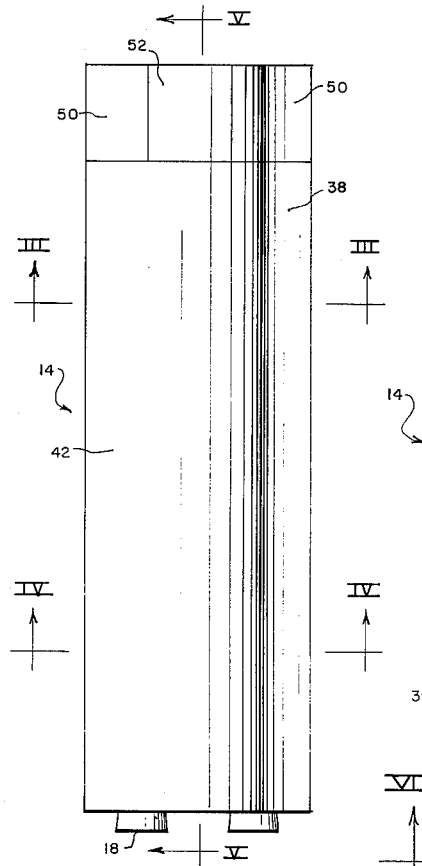
FIGURE 2 is a view in elevation of one embodiment of the invention showing a single stage which utilizes a plurality of aerodynamically self-sufficient propellant tanks.
Figure 5:
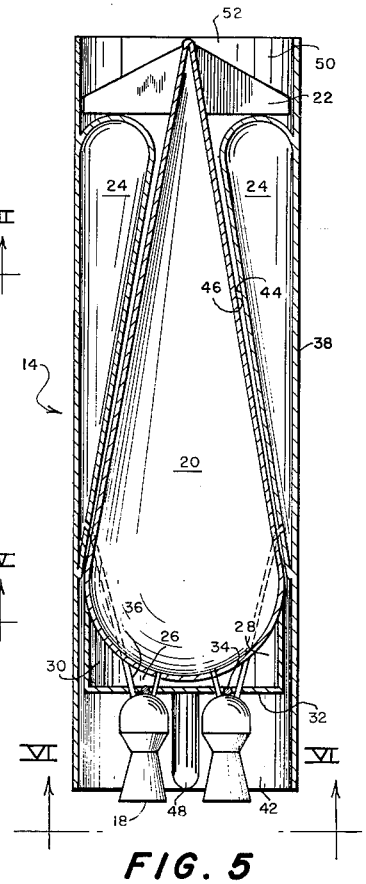
FIGURE 5 is a longitudinal sectional view taken on the line V—V of FIGURE 2.
Figure 3:
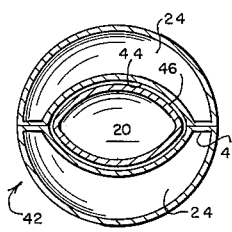
FIGURE 3 is a transverse sectional view on the line III—III of FIGURE 2.
Figure 4:
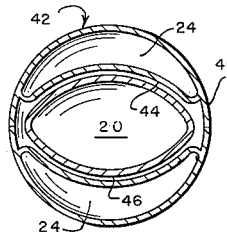
FIGURE 4 is a transverse sectional view on the line IV—IV of FIGURE 2.
Figure 6:
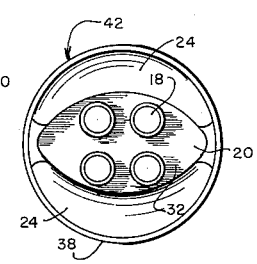
FIGURE 6 is a view of the rear of the device of FIGURE 5 looking in the direction of the arrows VI—VI.
Figure 16:
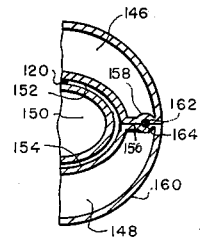
FIGURES 16, 17 and 18 are illustrations of various means of providing for separation of component parts.
Figure 17:
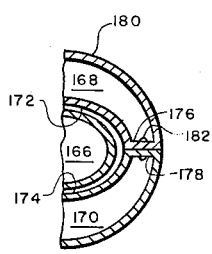
Figure 18:
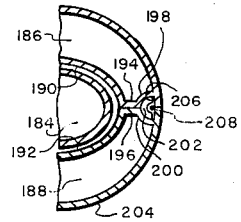

Referring now to the drawings, there is shown for orientation purposes in FIGURE 1 a conventional, multistage rocket vehicle configuration comprising a payload stage 10, a second stage 12 and a first stage 14 having fins 16 and motors 18 therewith. It is, of course, understood that the concept of this invention can be utilized with any stage and that the vehicle may employ any number of stages, but for the sake of clarity will be here illustrated in detail only for the first stage 14. FIGURES 2–6 exemplify one specific embodiment of the invention wherein there is shown one stage 14. This stage has an overall cylindrical shape (as best seen in FIGURES 3, 4 and 6). A fuel tank 20 is of an ellipsoidal cone-like configuration to provide a "wing" of sufficient aerodynamic area and stiffness to permit independent flight thereof, as best seen in FIGURES 3–6. This center tank 20 has control means formed integrally therewith, which means may include, but are not limited to, canard stabilizers 22 (with or without variable control surfaces) which fit over the thickest portion of oxidizer tanks 24 (as shown in FIGURE 5 and described below). Elevators 26, rudders 28 and air brakes 30 may obviously be provided at the aft end (best illustrated in the perspective view of FIGURE 7 and described with reference thereto), to act as stabilizing members during the recovery flight of the tank 20. The ellipsoidal configuration of this tank can best be realized by reference to FIGURES 3, 4 and 6 showing progressive sections, front to rear, of stage 14. Rocket engines 18 are attached to the aft end of the center tank in any conventional manner, illustrated here by bracket plate 32 and gimbaled bearings 34, and are provided with relatively short connecting propellant lines 36 which may, of course, be internal or external to the configuration. The remainder of the cylindrical figuration of the stage 14 is comprised of a shroud element 38 forming part of and extending beyond both ends of separable tanks 24. These tanks are illustrated as two in number, but may, of course, number as many as deemed necessary. The outer tanks 24 are removably secured together along flanges 40 (as best shown by FIGURE 3 for example, and described more fully hereinafter) and are formed so that externally each presents a substantially semicylindrical surface 42, and internally so that the mating surfaces 44 mate with the wall 46 of the ellipsoidal cone-shaped inner tank 20. When this stage has become detached from the latter stages, the outer tank elements 24 are caused to separate from one another (as by explosive bolts, Primacord, etc. as generally indicated in FIGURES 16–18 and explained in detail in reference thereto), the whole stage thus forming three separate, aerodynamically self-sufficient gliders or aircraft. Each of the outer tanks has formed with it a means, such as Primacord (illustrated and explained in detail in reference to FIGURES 14 and 15), to shape a portion of the outer tank surface 42 to form control surfaces, such as a stabilizer, to aid recovery. A servomotor/autopilot may be operatively connected to this control means, illustrated schematically at 48 of FIGURE 5, for variable control. The aft end (in relation to flyback position) of these tanks may be provided with variable position control surfaces such as rudders/brakes 50 and elevators 52. Obviously other means such as explosive bolts, air pressure or the manufactured final configuration could be employed without departure from the scope of this invention.

Figure 7:
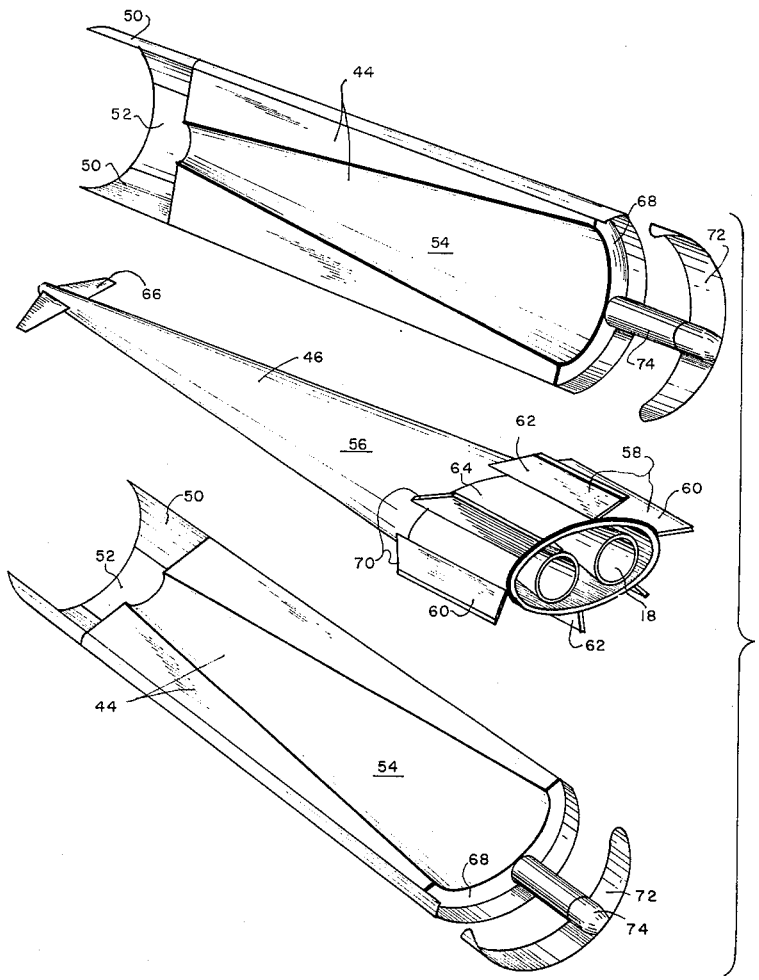
FIGURE 7 is a perspective view of the center, inner and outer tanks of a modification of the device of FIGURE 2 following separation.

FIGURE 7 is illustrative of a modification of the vehicle shown in FIGURES 1–6, and shows the major tank elements 54, 56 separated as they would be in flyback. Here, inner tank 56 is of the same configuration, essentially, as tank 20 of the previous embodiment, but has added thereto internal (in assembled relationship) outriggers 58 which form elevators 60 and rudders 62. Air brakes 64 may also be added, and the elements may be controlled by servomotor means (not shown). The brakes 64 may also be depressed so that they create a shroud to cut down base drag. Rudders 62 may also function as landing skids on recovery. The inner tank 56 may be provided with canard stabilizers 66, as was the embodiment of FIGURE 5, dependent on choice and/or necessity. The provision and operation of such control surfaces is well known, so no further detail is thought to be requisite. Motors 18 are of course provided, as in the prior embodiment. The outer sections 54 are substantially identical to sections 24 in FIGURE 5, with the exception that a mating surface 68 has been provided at the aft end (relative to the assembled position) to mate with the forward, sloping portions 70 of the elevators 60 and rudders 62 of the center section 56. In this modification, it is obvious that the mating "step" portion 68 of the outer tanks 54 will rest on the sloping portion 70 of the outriggers 58 of inner tank 56 when the sections are in their assembled relationship, thus, not only permitting additional control surfaces for the inner section 56 but also aiding in positioning and retaining the outer sections 54 in the launch position or relationship. The aft end of the outer sections may also be provided with rudders/brakes 50 and elevator 52, actuated by servo means (not shown). The forward (flight attitude) portion of the outer sections 54 is shown following formation of stabilizers 72 which may be actuated by servo means 74. As in the previous shown embodiment, the mating surfaces 44 of the tanks 54 are complementary to the mating surfaces 46 of tank 56.

In the embodiment of the invention as exemplified in FIGURES 8 and 9, the cylindrical configuration of the stage is maintained, but only two propellant tanks or compartments are utilized, designated for ease of reference in relation to the drawings as upper 76, and lower 78. FIGURE 8 is a section showing this configuration in elevation, while FIGURE 9 is a perspective view of the two sections separated. In this case, section 76 has an inner surface 80 and section 78 has an inner surface 82, which surfaces are sloped in opposite longitudinal and transverse directions so that one is the complement of the other when mated, thus presenting mutually mating surfaces along the interfaces 84 while retaining the necessary aerodynamic characteristics for separate flyback. Each of the tanks 76, 78 have canard stabilizer surfaces 86 which may be formed subsequent to separation, formed integrally therewith, and conventional autopilot receiver and servomotor means 88 thereon for control of the stabilizer surface. They may also have rudders and brakes 90 and elevators 92 with appropriate control means. The rocket motors 18 are secured at the aft end of the stage by any known conventional means, such as the bracket plate 32 and gimbaled bearings 34, and the sections are of course provided with propellant flow lines 36 from each of the tanks to the motors 18.

It is obvious that in each of the above modifications that the propellant transfer lines 36 are of minimum feasible length due to the fact that each of the propellant reservoir compartments (i.e., in FIGURE 5 compartments 20, 24; FIGURE 7 compartments 54, 56; and FIGURE 8 compartments 76, 78) extends to within a short distance of the engine(s) 18, terminating as nearly adjacent the engine as possible. Such a structure is desirable, of course, in that it not only reduces the weight inherent in relatively long transfer lines, but also decreases the number of joints required, insulation and/or special environment devices, and the shorter length creates lower flow resistance, thus permitting lower operating pressures.

There is included, as described above, in each of the sections, an autopilot and/or control receiver and servomotors, generally designated, where shown, by the reference numerals 48, 74, 88 in FIGURES 5, 7 and 8, respectively, to enable automatic and/or airborne command control for the actual recovery and landing procedure.

Control receivers of the type herein envisioned and employed are well known in the art and no further detailed discussion is therefore deemed necessary. Such devices are not considered to be a material part of the invention herein disclosed, but are rather perfecting devices facilitating practice of the invention in the application thereof. The actual landing procedure may of course be accomplished in many well-known ways, such as, by way of example, high altitude manned aircraft waiting for the flyback sections and guiding them to designated landing areas.

In another embodiment of the invention as illustrated in FIGURES 10–13, both an inner section or compartment 94 and an outer section or compartment 96 comprise self-contained stages. That is, they each contain all the propellant necessary, here illustrated as two propellants of a bipropellant system as shown at 98 and 100 of FIGURE 10. In this embodiment, the inner compartment or section 94 comprises a complete first stage while the other compartment 96 comprises a complete second stage made up of two semi-cylindrical sections 102, 104. It is apparent that the first stage 94 is telescopically received within the assembled second stage 96. The first stage 94 is provided at the aft end with rocket motors 18 and outriggers 106, as previously enumerated, and on the forward end has foldable stabilizer elements 108 which in the assembled position are pivoted backwardly about a pivot point 110 and are recessed into the nose portion 112 of the compartment 94. The outer portion 96 is formed so that it fits telescopically over the inner section 94, surface 114 mating with the inner section along the mating surfaces 116 at the interface 118 and being formed with a reduced portion 120 at the aft end so that the reduced portion thereof rests upon the forward portion 122 of the outriggers 106. The outer sections 102, 104 are, of course, also provided at the aft end with rocket motors 18. Upon burnout of the first stage it is released and ejected backwards, at which time the canard stabilizers 108 are automatically pivoted outwardly about the pivot point 110 and locked in place by any well-known means, as by springs, hydraulic pistons or cam latches (not shown), while the outriggers 106 serve as additional stabilizing and guiding elements (as best seen in FIGURE 13). The second stage 96 then continues until burnout, at which time the outer compartments 102, 104 are separated from one another in any known manner, such as set forth in the previous embodiments, and separately begin the flyback. It is of course obvious that these sections may be provided, if deemed necessary, with stabilizer forming means such as shown and described hereinafter in reference to FIGURE 14. In this embodiment, as best shown in FIGURE 10, each of the sections or tank elements 102, 104 and 94 are provided internally with the necessary propellant compartments, 98 and 100, to form thereby a complete and self-sufficient unit. Engine brackets 32, gimbaled joints 34 and propellant lines 36 are provided as previously noted.

Figure 14:
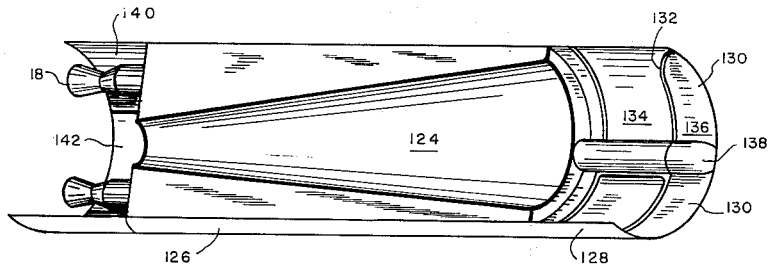
FIGURE 14 is a perspective view of one means of forming the shell, following separation, to form the stabilizers.
Figure 15:
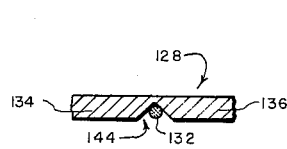
FIGURE 15 is a detail of the stabilizer forming means illustrated generally in FIGURE 14.

FIGURES 14 and 15 are illustrative of the manner in which the stabilizers of an outer section, designated here as 124, may be formed. It is, of course, applicable to any of the embodiments illustrated. With reference to FIGURE 14, an outer section 124 comprises a semi-cylindrical tank segment 126 and a shell section 128 formed integrally therewith. The shell section 128 forms stabilizer elements 130 for the flyback of the section and is therefore provided with an explosive forming or shaping means, here illustrated as Primacord 132 or the equivalent, attached to the shell in such a manner that when activated it causes a portion 134 of the shell section 128 to break away from the portion 136, thus forming the stabilizing element 130. Conventional autopilot means, schematically shown by 138, may be used as more fully described previously. Obviously this result could be accomplished by other known means such as preformed flanges interconnected by explosive bolts, shear pins, etc. and is here provided merely as an example of one means of forming the desired surface. Additional guidance means may also be provided, such as rudder/brakes 140, elevators 142 and engines 18. In FIGURE 15, the Primacord 132 is illustrated as being positioned in a recessed channel 144 in the shell section 128, which channel is preformed in the desired curve as shown in FIGURE 14 to properly shape the separated portions 134, 136 to achieve the desired stabilizer shape.

FIGURES 16, 17 and 18 exemplify some of the preferred means by which the flyback sections may be separated from one another. With reference to FIGURE 16, the sections are designated as outer sections 146 and 148 respectively, and inner section 150. Although these means are here illustrated only for the outer sections 146, 148, for the sake of clarity and simplicity, it is apparent that the principle is applicable to the securement and separation of the inner compartment 150 from the outer compartments 146, 148 as well. Thus in FIGURE 16 there are shown semi-cylindrical tank sections 146, 148 secured together along mating surfaces 152, 154 respectively at interface 156. Here, one portion of the surfaces 152, 154 are formed with semicircular recesses 158 adjacent to the shroud outer surface or skin 160 of the sections. When the sections 152, 154 are mated to one another, the semicircular recesses 158 provide a channel 162 into which is positioned an explosive means 164, such as Primacord. It is obvious that on activation of the explosive means the securement means between the sections 152, 154, such as weldments, bolts, or shear pins, are released and the sections are thereby separated.

In the modification of FIGURE 17, an inner section 166 is encompassed by outer sections 168, 170. Section 168 has an inner surface 172 which mates with inner section 166 and surface 174 of section 170 along flange portions 176, 178, which flanges join the interior faces 172, 174 to shroud portion 180. The flanges 176, 178 are secured together by explosive bolt or shear pin means 182 so that on activation of the securing means the sections will separate from each other.

FIGURE 18 illustrates still another separation construction wherein the vehicle comprises a center tank 184 and outer tanks 186, 188 which have inner faces 190, 192 respectively. These faces encompass section 184 interiorly, and are provided with flange portions 194, 196, which flanges are flared outwardly at 198, 200 to form a wide channel 202 adjacent the shroud surface 204. Positioned within this channel 202 are bracket elements 206 which act as securing means between sections and as a holding means for the explosive separation means 208. From the above examples given, it is apparent that many different means may be employed to accomplish separation when and how desired, the above examples being for purposes of illustration only.

Figure 19:
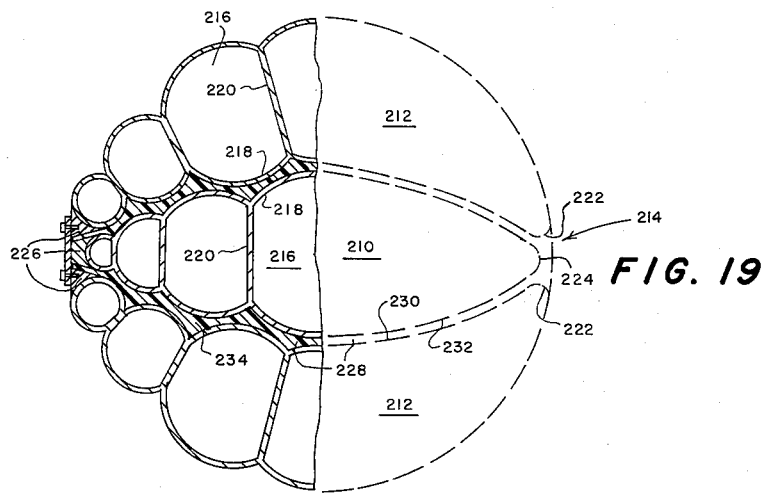
FIGURE 19 is a partial sectional view exemplifying a pressure-vessel construction of the sections of the tanks.

In the embodiment as illustrated in FIGURE 19, the individual sections of the tanks are similar in construction to the three tank sections 20 and 24 shown in FIGURE 4. However, instead of being smooth and cylindrical in shape, as indicated by the dotted lines in FIGURE 19 for purposes of simplicity and clarity, each tank section is built up as a pressure supported multi-cell vessel structure. Thus, there is shown a partial section through a vehicle having a center tank section 210 with surrounding outer tank sections 212 being secured at the edges 214. Each of the tank sections 210 and 212 consists of a multi-cell vessel structure. These walls 220 can, of course, be perforated to provide intercommuniaction between compartments 216. The section edges 222, 224, meeting at 214, are reinforced by a suitable material 226. At the interfaces 228 between the mating surfaces 230, 232 of the sections 210 and 212 there is provided and insulation 234 (such as silicon rubber) which serves both as protection against aerodynamic heat during re-entry of the recovery stage and as insulation to compensate for differences in contraction and expansion of the sections. The insulation 234 may obviously be fitted loosely between the tank sections 210 and 212 or attached to the surface of either tank section. The utilization of such a pressure supported tank or body structure is advantageous in that there is no basic weight penalty, since the additional weight of the tension walls 220 is compensated for by a saving in required skin thickness of the walls 218 due to the curvature of the walls. In addition, such a structure is quite advantageous in that it functions both as wing spars and as sloshing baffles without the necessity of additional structure. The tank sections 210 and 212 are secured together and separated or released for the purpose of flyback to designated landing areas by utilizing flanges and explosive means, such as explosive bolts, Primacords, etc., explained in detail hereinbefore in connection with the embodiments shown in FIGURES 16, 17 and 18.

Figure 20:
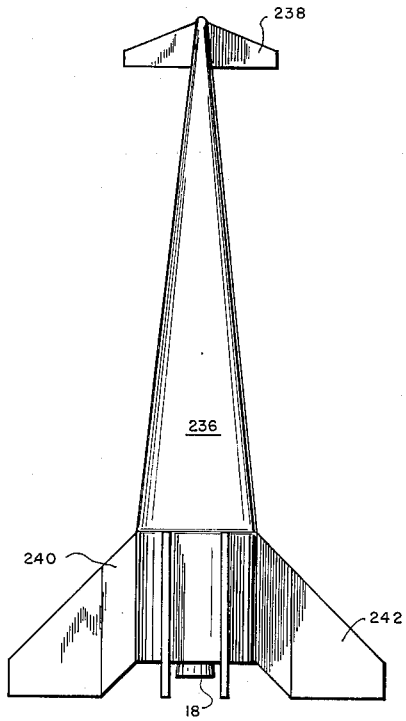
FIGURE 20 is a side elevational view of a modification of the invention wherein the center tank has additional stabilizing means.

FIGURE 20 is illustrative of a variation of the device of FIGURES 10–13 wherein an inner section 236 having motors 18, canard stabilizers 238 and outriggers 240 has fins 242 formed integrally therewith, which fins will also function as additional wing area stabilizers and landing skids for the inner section in much the same manner as the internal outriggers 106 of FIGURES 10–13, and may be merely an extension thereof as shown. Fins 242 may, however, be omitted if desired without materially or adversely affecting the recovery capabilities of the flyback sections, and are considered merely as perfecting devices insofar as practice of the invention is concerned.

In a typical example of the invention, the wing loading of an empty center body with fins and without fins is in the order of 37 lbs./ft.$^2$ and 47 lbs./ft.$^2$ respectively, with landing speeds of 144 and 162 m.p.h., while the wing loading of an empty outer tank is about 12 lbs./ft.$^2$ with a landing velocity of about 97 miles per hour.

The above figures are derived for a "typical" vehicle according to the invention, as follows:

The first stage of a multi-stage rocket vehicle would develop three million pounds of thrust; the launch weight for such a stage (calculated for optimized performance) would be $W_0 = 1.5$ million pounds.

Present large liquid first stages of the oxygen-kerosene type have a structural efficiency factor of better than 6%, that is, the propellant weight carried in such a stage is about 94% of the launch weight. The structural weight is then $$W_S = 1,500,000 \times 0.06 = 90,000 \text{ lbs.}$$

This weight may, in turn, be broken down into $$W_S = W_3 + W_4 + W_5$$

where:

$W_3$=weight of fuselage and equipment
$W_4$=weight of propulsion system and accessories,
$W_5$=weight of recovery equipment.

For example, these weights would be respectively 50,000 lbs.; 35,000 lbs.; and 5,000 lbs. for the vehicles illustrated herein.

This structural weight will, however, be increased, for the flyback, by residual propellants and by residual gas for tank pressurization by about 10,000 lbs. Thus, the total weight to be recovered will be $W_R = 100,000$ lbs.

This in turn will be divided between the center body ($W_C$) and the separated outer bodies ($W_{T1}$ and $W_{T2}$) as follows:

$W_C = 66,000$ lbs.
$W_{T1} = 17,000$ lbs.
$W_{T2} = 17,000$ lbs.

The wing area of the recovery bodies may be determined by:

(1) *Center Body.*—Assuming a diameter of 28 feet for optimum performance, the total length of the first stage becomes 75 feet. The vehicle can, of course, be flown without fins for unmanned missions, but for a manned mission, to provide aerodynamic stability, would require four fins of 250 ft.$^2$ area each. The aerodynamic surface ($A_C$) of the center body following separation therefore consists of an engine shroud portion 25 feet long and 28 feet in diameter, and a forward, or cone-like, portion 50 feet long with an average diameter of 14 feet. Thus $$A_C = 25' \times 28' + 50' \times 14' = 1400 \text{ sq. ft.}$$

The aerodynamic surface with fins would be $$A_{CF} = 1400 + 2 \times 250 = 1900 \text{ sq. ft.}$$

The aerodynamic surface of each outer tank, following separation, would be $$A_T = 50 \times 28 = 1400 \text{ sq. ft.}$$

The wing loadings thus become
(1) Center body without fins:

$$\frac{W_C}{A_C} = \frac{66,000}{1400} = 47 \text{ lbs./ft.}^2$$

(2) Center body with fins:

$$\frac{W_C + W_F}{A_{CF}} = \frac{66,000 + 4,000}{1900} = 37 \text{ lbs./ft.}^2$$

(3) Outer tank:

$$\frac{W_T}{A_T} = \frac{17,000}{1400} = 12 \text{ lbs./ft.}^2$$

The landing velocity is found from substitution in the formula $$v = \left(\frac{W}{A} \frac{2}{C_L \rho}\right)^{1/2} \times 0.682$$

in miles per hour, where;

$\rho$=air density at sea level=$0.02378 \frac{\text{lb.} - \text{sec.}^2}{\text{ft.}^4}$ $C_L$ is the lift coefficient at touchdown and (1) for the center body $C_{Lmax} = 0.7$
(2) for the outer tank $C_{Lmax} = 0.5$ Thus, landing velocity for the center body without fins would be:

(1) $\quad v_C = \left(47 \frac{2}{.1 \times .002378}\right)^{1/2} \times .682 = 162 \text{ mi./hr.}$ for the center body with fins;

(2) $\quad v_{CF} = \left(37 \frac{2}{.7 \times .002378}\right)^{1/2} \times .682 = 144 \text{ mi./hr.}$ and for each of the outer tanks $$v_T = \left(12 \frac{2}{.5 \times .002378}\right)^{1/2} \times .682 = 97 \text{ mi./hr.}$$

Although the above examples are of course drawn to an idealized configuration, they exemplify the characteristics given, and will be substantially true for any of the three body vehicles shown. Changes in dimensions will, naturally, change the results derived, however, since such results are foreseeable and subject to calculation, as shown above, such changes are clearly within the skill of the art. It should be noted also that the specific example given is for a three body configuration, but the general principle will apply to the two body vehicle, such as shown in FIGURE 8 as well. The examples are given by way of illustration only, and are not intended to limit either dimensions or configuration as disclosed.

Although the preferred embodiment above utilizes a pressure supported vessel structure, the individual sections could be fabricated of sandwich shell construction as is conventional in airplanes without departing from one concept of the invention.

It is apparent that many modifications and perfecting devices could be employed in the practice of this invention without departure from the scope thereof. Among such devices which it is not deemed necessary to illustrate, in that they form no part of the invention and would be obvious to those skilled in the art, are the possibility of powered flyback as opposed to a mere glide, as well as the employment of aerodynamic means such as a collapsible extended shroud at the aft end of individual units to prevent base drag, and movable slots, suction slots and flaps on aerodynamic surfaces for boundary layer control, as well as the possibility of in-flight shifting of residual or unused propellants by pump means or an induced gravity force to properly position such propellants to insure a proper relationship for the center of gravity.

Obviously, many modifications and variations of the present invention are possible in the light of the above specifications. It is therefore to be understood that within the scope of the appended claims the invention may be practiced other than as specifically described.

I claim:
1. A recoverable rocket vehicle comprising:
(A) a plurality of stages having fore and aft ends,
(B) at least one of said stages being of cylindrical configuration,
 (1) at least one of said stages having rocket motors at the aft end thereof,
 (2) said last named stage comprising a plurality of sections,
  (a) at least one of said sections being provided with propellant storage means,
  (b) said last named section having cooperative means integral therewith operative to transfer propellant from said propellant storage means to said rocket motors,
  (c) one of said sections having a relatively wide and thickened portion terminating at the aft end of said stage configuration and having at least one of said motors operatively secured thereto, said section tapering in at least one direction toward the fore end of said stage,
  (d) another of said sections having a relatively wide and thickened end terminating at the fore end of said stage and tapering in at least one direction toward the aft end of said stage,
  (e) the mutually facing surfaces of said sections being complements of each other,
  (f) at least two of said sections having one face thereof as an exterior surface of said stage when said sections are in an assembled relationship, said last named faces being of semicylindrical configuration,
 (3) each said section comprising a pressure-supported tank construction which comprises,
  (a) a plurality of abutting generally cylindrical compartments built up to form each section to its ultimate configuration,
  (b) said abutting compartments having common tension walls therebetween and individual curved outer walls,
 (4) said sections having an insulation material interposed therebetween operative to insulate said sections one from the other and to permit differential expansion and/or contraction between said sections,
 (5) releasable securing means between said sections operable to separate said sections selectively,
 (6) control means integral with said sections,
  (a) at least some of said control means being flight stabilization means formable following separation of said sections by means altering the surface configuration thereof,
  (b) others of said stabilization means being integral with said sections and operable on separation of the sections,
  (c) said control means including environment or command responsive means operative to actuate said stabilization means,
 (7) and reinforcing means on the outside edges of said sections.

2. A recoverable rocket vehicle comprising:
(A) a plurality of stages,
(B) at least one of said stage being cylindrical in configuration and having rocket motors thereon,
 (1) at least one of said stages comprising a plurality of sections,
  (a) some of said sections being provided with propellant storage means and having cooperative means integral therewith operative to transfer propellant from said propellant storage means to said rocket motors,
  (b) one of said sections having at least one of said motors operatively secured thereto,
  (c) some of said sections having a thickened end terminating in proximity to the fore end of said stage, and tapering in at least one direction toward the aft end of said stage,
  (d) mutually facing surfaces of said sections being complements of each other,
  (e) at least two of said sections having one face thereof as an exterior surface of said stage when said sections are in an assembled relationship,
 (2) each said section comprising a pressure supported tank construction which comprises
  (a) a plurality of abutting generally cylindrical compartments built up to form each section in its ultimate configuration,
  (b) said abutting compartments having common tension walls therebetween and individual curved outer walls,
 (3) releasable securing means between said sections operable to separate said sections selectively,
 (4) control means integral with said sections,
  (a) at least some of said control means being flight stabilization means formable following separation of said sections by means altering the surface configuration thereof,
  (b) others of said stabilization means being integral with said sections and operable on separation of said sections.

3. A rocket vehicle as defined by claim 2 wherein at least two of said stages are in telescopic relation one to the other,
(A) one of said stages comprising a body member of essentially ellipsoidal configuration having a relatively wide, thick aft end and tapering toward the fore end,
the flight stabilization means of said stage including outriggers on the aft end thereof,
said outriggers each having an aftwardly and outwardly sloping leading edge,
(B) the other of said stages comprising two sections removably secured together,
 (1) said sections encompassing and fitted around said first stage and having interior surfaces which are complements to the exterior surface of said first stage and to a portion of an interior surface of each other,
 (2) said sections tapering from a relatively wide, thick configuration at the forward end of the assembled stages aftwardly, and
 (3) a step portion at said aftward end, said step portion mating with the leading edge of said outriggers to thereby aid in supporting said sections,
(4) each of said outer sections having propellant storage means therein and rocket motors at the stage aft end,
said motors and propellant storage means being operatively interconnected.

4. The rocket vehicle as defined by claim 2 wherein said plural section stage comprises
(A) an inner section having propellant storage means, rocket motors, and propellant transfer means operably intercommunicating said storage means and said motors,
(B) two outer sections releasably secured to each other and to said inner section,
(1) said inner section constituting propellant storage means,
(2) propellant transfer means operably interconnecting said outer sections and the motors of said inner section,
(C) said inner section being of ellipsoidal configuration and tapering outwardly from fore end to aft end.

5. A multiple stage rocket vehicle wherein each stage is cylindrical and comprises
(1) thrust directing means and
(2) separable inner and outer sections,
(3) each section having stabilizer and control surfaces integral therewith, said inner section being of generally ellipsoidal cone shape,
(4) said outer sections fitting around said inner section and mating with said inner section and each other at the interfaces thereof,
(5) said outer sections presenting cylindrical outer surfaces when mated to one another,
(6) said sections being releasably secured together, thus serving to make said sections separable,
(7) each said section forming an aerodynamically self-sufficient wing serving to make said sections capable of return flight.

6. A multiple stage rocket vehicle wherein each stage comprises thrust directing means operatively connected with propellant storage means, and wherein
(A) at least two of said stages are telescoped, thereby forming an inner stage and an outer stage,
(B) said inner stage being detachably secured to said outer stage,
(C) said outer stage comprising
(1) at least two separable sections each of semi-cylindrical shape on the outer surface thereof,
(2) each said outer section having like substantially longitudinal facing surfaces detachably secured together,
(D) said inner stage having stabilizer means and autopilot actuated control surfaces integral therewith,
(1) said inner stage stabilizer means including a pivotally inwardly folded canard stabilizer outwardly rotatable and lockable in the operative position on release of said inner stage and
(2) outriggers at the aft end of said stage,
(3) said outriggers serving as structural carrying members for said outer stage during the launch phase, and
(E) autopilot actuated control and stabilizer means on each said outer section, thus constituting said inner stage and each of said outer sections airworthy, aerodynamically stable bodies capable of flight return to a predetermined area.

7. A structure for use as a stage in a multistage rocket vehicle comprising;
(A) a plurality of mated, detachably secured aerodynamically self-sufficient built-up sections
(1) releasably joined together in the longitudinal direction,
(2) insulation between the facing surfaces of said sections,
(B) each said section having selectively actuated control and stabilizer means formed integrally therewith,
(C) each said section comprising a multiplicity of abutting substantially cylinder-like bodies defined by peripheral walls,
said bodies having their mating walls rigidly secured together forming common tension walls, the structure thus forming a pressure supported container,
(D) each said section having external reinforcing and securing elements attached at the longitudinal edges thereof.

References Cited by the Examiner
UNITED STATES PATENTS
2,937,597   5/60   Winn et al. _____ 244—117.1

FOREIGN PATENTS
756,765   9/56   Great Britain.
831,978   4/60   Great Britain.

OTHER REFERENCES
Aviation Week, April 28, 1958, pp. 26, 27, 28.
Jet Propulsion, November-December 1954, pp. 369, 370, 371.

FERGUS S. MIDDLETON, *Primary Examiner.*